United States Patent [19]

Landt

[11] Patent Number: 4,457,485

[45] Date of Patent: Jul. 3, 1984

[54] WALL HANGING METHOD AND MEANS

[75] Inventor: Madlon C. Landt, Raleigh, N.C.

[73] Assignee: William E. Lynn, Raleigh, N.C.

[21] Appl. No.: 328,005

[22] Filed: Dec. 7, 1981

[51] Int. Cl.³ ............................................. F16M 13/00
[52] U.S. Cl. .................................... 248/542; 248/544; 33/180 R; 29/407
[58] Field of Search ............... 248/544, 546, 547, 542, 248/467; 33/180 R, 189; 29/407, 526 R

[56] References Cited

U.S. PATENT DOCUMENTS

| | | | |
|---|---|---|---|
| 2,030,135 | 2/1936 | Carpenter | 248/544 |
| 2,775,812 | 1/1957 | Mohr | 248/544 |
| 3,416,765 | 12/1968 | Ebner | 248/467 |
| 3,516,165 | 6/1970 | Pfeffer | 33/189 |
| 3,530,591 | 9/1970 | Moffitt | 248/544 |
| 4,220,309 | 9/1980 | Eisen et al. | 248/544 |
| 4,241,510 | 12/1980 | Radecki | 33/189 |
| 4,372,050 | 2/1983 | Eisenhower | 33/180 R |

*Primary Examiner*—R. P. Machado
*Assistant Examiner*—Alvin Chin-Shue
*Attorney, Agent, or Firm*—Jacob Shuster

[57] ABSTRACT

The outline of a wall hanging object is cut out of a flexible sheet of material to form a transfer blank adapted to be positioned on a wall surface and adhesively held thereon at a desired location. The hanging point on the object is located and transferred to the transfer blank by a marking tool. The hanger device for the object is nailed to the wall surface through the transfer blank at the hanging point marked thereon, after which the transfer blank is removed.

19 Claims, 12 Drawing Figures

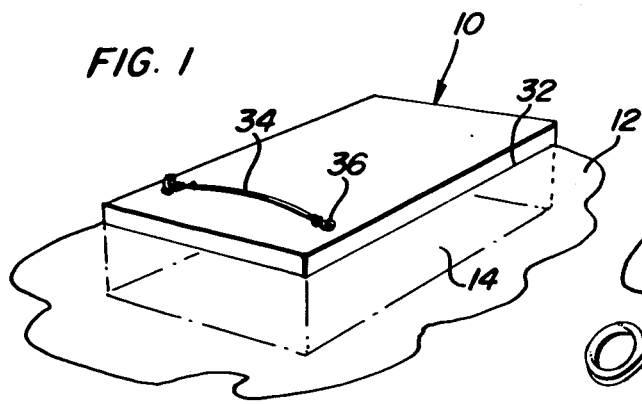
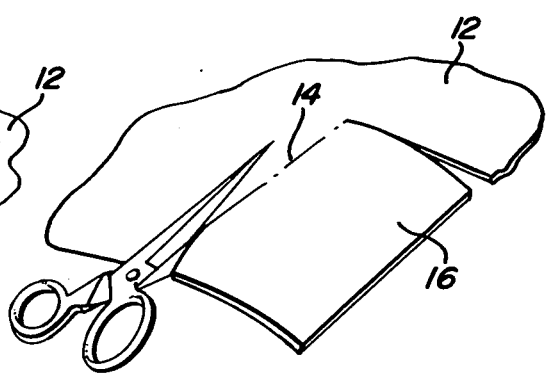
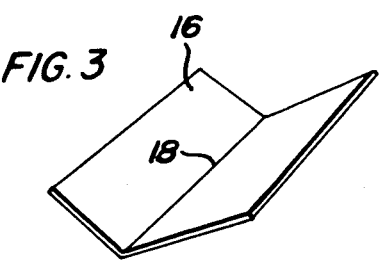
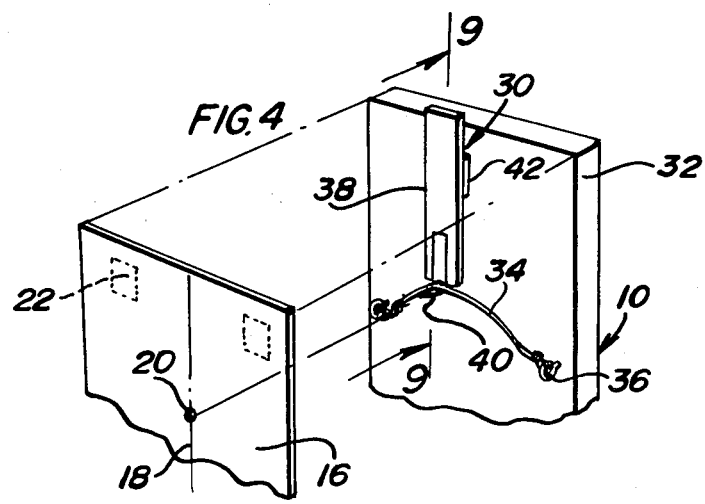
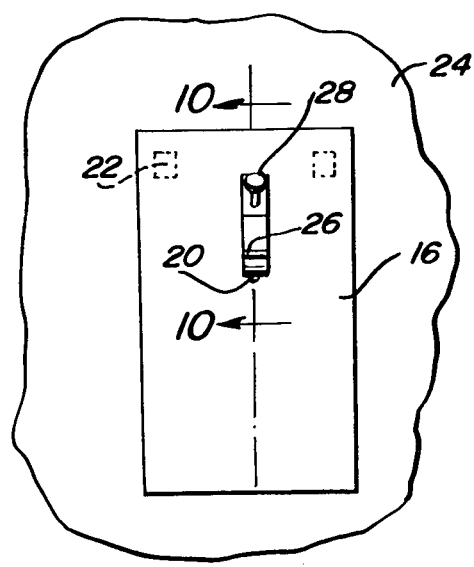
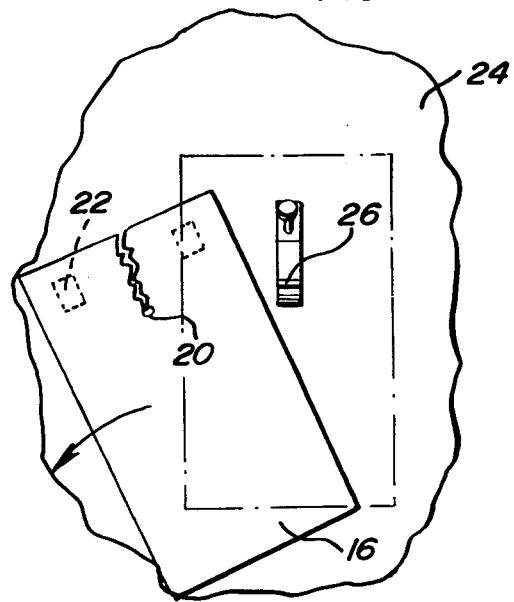

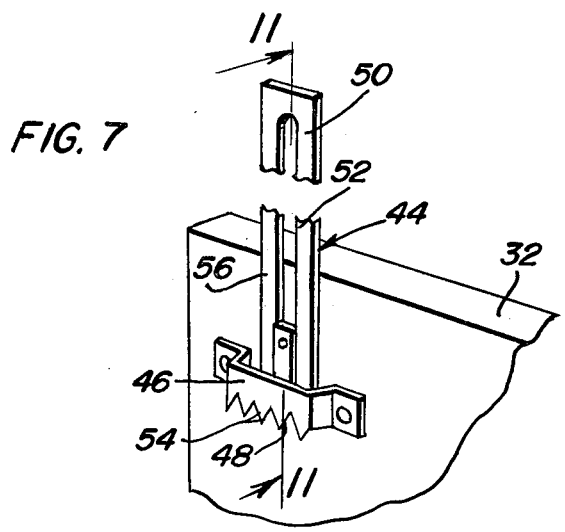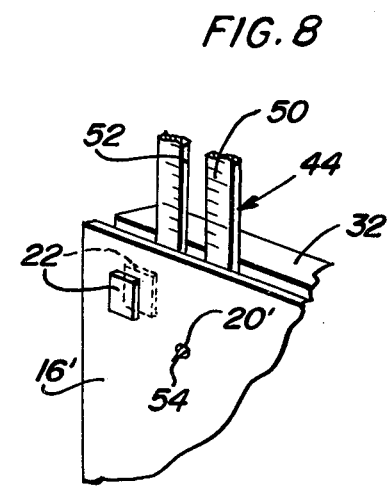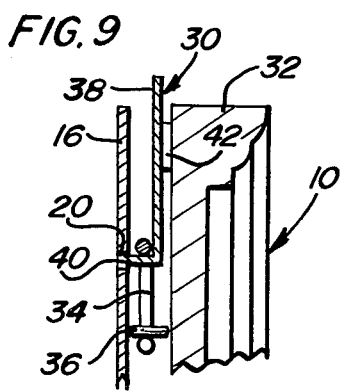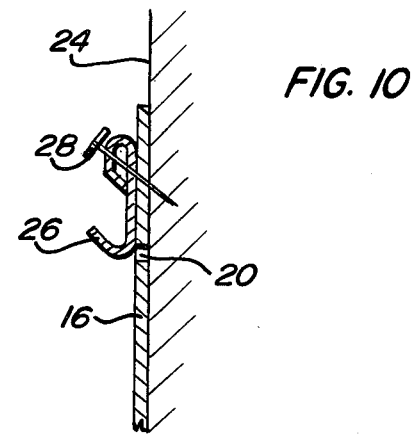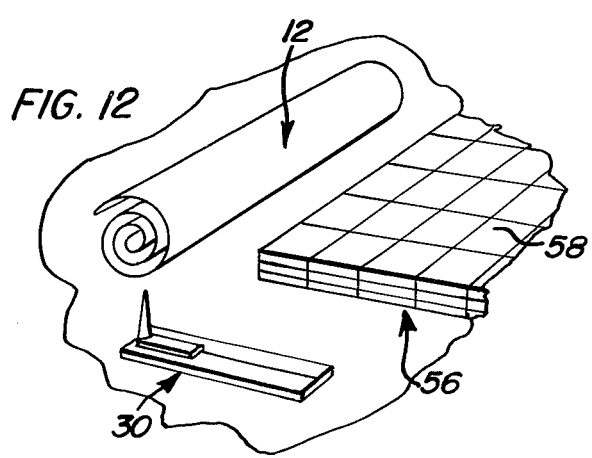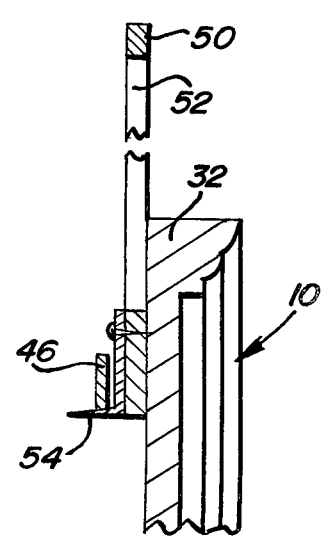

WALL HANGING METHOD AND MEANS

BACKGROUND OF THE INVENTION

This invention relates to the hanging of objects on a vertical wall supporting surface including the hanging of articles such as framed pictures, mirrors, artifacts and other ornamental bodies, utilizing conventional wall hanging hardware.

The hanging of framed pictures, by way of example, on interior wall surfaces for decorative purposes by non-professional persons is often a difficult trial-and-error task, resulting in unintended marring of the wall surface. Various wall hanging aids and methods have heretofore been devised to ease the problems involved, as disclosed, for example, in U.S. Pat. Nos. 3,516,165, 4,220,309 and 4,241,510.

According to each of the foregoing prior U.S. patents, a framed picture is suspended by its hanger device in the form of suspension wire, from a special implement through which the picture is positioned against a wall surface for trial and error determination of a desired hanging location. The special implement is then utilized to mark a nailing location directly on the wall surface. Such prior art hanging methods do not avoid trial and error movement and temporary holding of the picture on the wall surface at different positions in order to locate a desired hanging position. A person attempting to hang a picture without assistance from others will still have a problem in selecting a desired location, especially when handling large and heavy pictures, since the picture cannot be temporarily held on the wall at any location without nailing to permit long range viewing of it alone or in combination with other pictures to be hung. Further, accidental marring of the wall surface sometimes occurs from the shifting of the position of the picture over the wall surface during the trial and error placement operation.

It is therefore an important object of the present invention to provide improved method and means for hanging of objects such as framed pictures on wall surfaces which avoids the aforementioned problems and drawbacks of prior art methods.

SUMMARY OF THE INVENTION

In accordance with the present invention, a wall hanging object such as a framed picture has its outer periphery traced as an outline on a sheet of flexible material such as paper. The picture outline is then cut out of the paper to form a transfer blank to which the picture hanging point or points are transferred from the picture by use of a punch type marking tool. The transfer blank is then utilized in place of the picture itself to locate a desired position for the picture on the wall surface. Thus, the transfer blank may be easily moved over the wall surface without any marring thereof in a trial and error location-determining operation. Adhesive applied to the transfer blank will temporarily hold it in any position on the wall surface so that one may back off and view selected locations without any difficulty. Once the location of the transfer blank is decided upon, wall hanger hardware may be placed directly on the transfer blank at the hanger point or points previously marked thereon and nailed to the wall surface through the paper of the transfer blank. The transfer blank may then be simply torn or pulled away from the wall surface leaving the hanger hardware nailed thereto for hanging of the picture.

In accordance with one embodiment, the marking tool is designed for picture hanging devices which include a flexible suspension wire. In such case, a punch element of the marking tool projecting from one end of an elongated member placed against the back of the picture is centrally engaged with the suspension wire to displace it to a load-tensioned hanging condition in order to locate a hanging point on the back of the picture. Such hanging point is transferred to the transfer blank by placing the blank against the back of the picture so that it may be punctured by the punch element at the hanging point. Where the picture is hung by one or more rigid hanger brackets having lower serrated edges, the tool punch element is engaged with such serrated edge to locate the hanging point and mark it on the transfer blank.

Other features and advantages of the invention will become apparent from the following detailed description, taken in conjunction with the accompanying drawings illustrating by way of example the principles of the invention.

BRIEF DESCRIPTION OF THE DRAWINGS

FIG. 1 is a perspective view showing the back of a framed picture placed over a sheet of paper in an initial step of the hanging method of the present invention.

FIG. 2 is a perspective view showing the cutting out of a transfer blank from the sheet of paper shown in FIG. 1.

FIG. 3 is a perspective view showing the formation of a center line in the transfer blank.

FIG. 4 is a perspective view illustrating the marking of a hanging point on the transfer blank.

FIG. 5 is a plan view of the transfer blank placed on a wall surface with a hanger nailed therethrough onto the wall surface at a desired hanging location.

FIG. 6 is a plan view showing removal of the transfer blank from the hanging location of the wall surface.

FIG. 7 is a partial perspective view showing the location of a hanging point on a picture having a rigid hanger bracket secured thereto.

FIG. 8 is a partial perspective view showing the marking of the hanging point on the transfer blank corresponding to the embodiment of FIG. 7.

FIG. 9 is a partial section view taken substantially through a plane indicated by section line 9—9 in FIG. 4.

FIG. 10 is a partial section view taken substantially through a plane indicated by section line 10—10 in FIG. 5.

FIG. 11 is a partial section view taken substantially through a plane indicated by section line 11—11 in FIG. 7.

FIG. 12 is a partial perspective view showing components of a proposed kit to be utilized for picture hanging in accordance with the present invention.

DETAILED DESCRIPTION OF PREFERRED EMBODIMENTS

Referring now to the drawings in detail, FIG. 1 illustrates a first basic step in the hanging of object, such as a framed picture 10, on a supporting wall surface. The picture 10 is placed on a sheet of flexible material, such as paper 12, and an outline 14 is traced thereon as shown. By cutting along the outline 14 as shown in FIG. 2, a cut-out transfer blank 16 is separated from the sheet of paper. The transfer blank 16 may then be folded in half, as shown in FIG. 3, to form a center fold line 18. A hanger point mark 20 is then placed on the center line 18 as shown in FIG. 4, in a manner to be described hereinafter in greater detail. Spaced adhesive patches 22 are placed on one side of the transfer blank 16 preferably adjacent to the upper corners, as also shown in FIG. 4. The transfer blank 16 which corresponds in peripheral outline to the ornamental object of picture 10, may then be positioned on a supporting wall surface 24 at a desired location as shown in FIG. 5 to simulate placement of the picture on the wall surface without marring of the surface. The transfer blank 16 is held in the desired position by the adhesive patches 22, preferably of a pressure sensitive type which are readily peelable from the surface 24. With the transfer blank so mounted on the wall surface, a conventional picture hanging hook device 26 may be secured to the wall surface over the transfer blank by means of a nail 28, as shown in FIGS. 5 and 10. The hook device is nailed in position over the hanger point mark 20 on the transfer blank. Once the hook device is nailed to the wall surface, the transfer blank may be pulled away or removed as shown in FIG. 6, and discarded. The picture 10 may then be hung on the hook device 26 occupying the surface area on the wall surface 24 previously occupied by the transfer blank to complete the wall hanging procedure in accordance with one embodiment of the present invention.

As shown in FIGS. 4 and 9, marking of the transfer blank 16 is accomplished by use of a marking tool generally referred to by reference numeral 30. The tool 30 is useful in connection with a picture 10 having a frame 32, to the back of which a flexible suspension wire element 34 is conventionally secured through spaced hardware such as eye elements 36. The marking tool includes an elongated member 38 having opposite longitudinal ends. A punch point element 40 is secured to one end of member 38. An adhesive patch 42 may be utilized to hold the member 38 on the back of the picture frame after displacement of the wire 34 to a load tensioned hanging condition by the punch point element 40 centrally engaged therewith, as shown in FIG. 4, in order to locate the hanger point relative to the back of the picture before it is hung. The longitudinal axis of the tool 30 through its elongated member 38 is also centered on the back of the picture frame for alignment with the center line 18 on the transfer blank 16 which is then placed in contact with the back of the picture frame as shown in FIG. 9 so that the punch element 40 may punch a small hole in the transfer blank constituting the hanger point mark 20 aforementioned. The hanger point is transferred to the wall surface by holding the hook device on the transfer blank at the mark 20 and nailing it to the wall surface.

A somewhat different marking tool 44 is utilized in a somewhat different manner from that described with respect to FIGS. 4 and 9, when the picture frame 32 is hung by means of one or two hanger brackets 46 as shown in FIG. 7. The hanger bracket 46 is a conventional piece of hardware nailed to the back of the picture frame as shown presenting a lower serrated edge 48 on which a hanger point is located. The marking tool 44 consists of an elongated straight-edge ruler 50 having an elongated slot 52 formed therein along its longitudinal axis. A punch element 54 is secured to one end of the ruler 50.

Where two hanger brackets 46 are nailed to the back of the picture frame adjacent each side as shown in FIG. 7, equally spaced marks 56 may be placed along the top edge of the frame visible through the slot 52 of the tool 44 when placed against the back of the frame with the punch element 54 in engagement with edge 48 of the hanger bracket 46 at the hanger point. The hanger brackets 46 may thereby be nailed to the frame at equally measured distances from the top edge of the frame. The transfer blank 16' when placed in contact with the back of the picture frame as shown in FIG. 8, will accordingly have hanger point marks 20' punched therein by the punch element 54. It will therefore be apparent that the transfer blank 16' may be positioned on a wall surface to locate the desired position of the subsequently hung picture, as hereinbefore described with respect to FIGS. 5 and 6. The transfer blank 16' also locates the hanger points at marks 20' through which nails may be hammered into the supporting wall surface. The picture is supported by engagement of the edges 48 of the hanger brackets 46 with such nails after the transfer blank is pulled or torn away from the nails.

Two hanger brackets 46 could also be nailed to the back of the picture frame with unequal spacing from the edges if the foregoing measuring procedure involving use of tool 44 were not utilized. In such case the tool 44 is simply used to position the punch element 54 as shown in FIGS. 7 and 8 at whatever location the serrated edges 48 happen to be. The location of the unequally spaced hanger points on the serrated edges 48 may thereby be marked on a transfer blank 16' as punch holes 20'. By holding such transfer blank on a wall surface by means of the adhesive patches 22, the hanger points may be transferred to the wall surface by hammering nails through the transfer blank at the punch holes 20'.

As shown by way of example in FIG. 12, assembled materials and tools for hanging pictures or other such articles on a wall surface may be sold in kit form with an instruction sheet. The kit would include, for example, a roll of paper 12, a tool 30 (or 44) as hereinbefore described, and a sheet 56 of adhesive segments having outer protective layers 58 thereon. The adhesive segments may be separated from sheet 56 and used as the adhesive patches 22 and 42 hereinbefore referred to for temporarily holding the transfer blank on the wall surface or the tool on the back of the picture.

It will be apparent from the foregoing description that the method of the present invention is applicable to all types of wall hanging objects, artifacts and articles as well as pictures. The method is also adaptable to the use of different types of hanger hardware and avoids in all cases any wall marring contact with the wall surface or wrong nail holes and yet permits trial and error determination of the desired hanging location.

It should also be understood that the foregoing detailed description is given merely by way of illustration and that variations may be made without departing from the spirit of the invention.

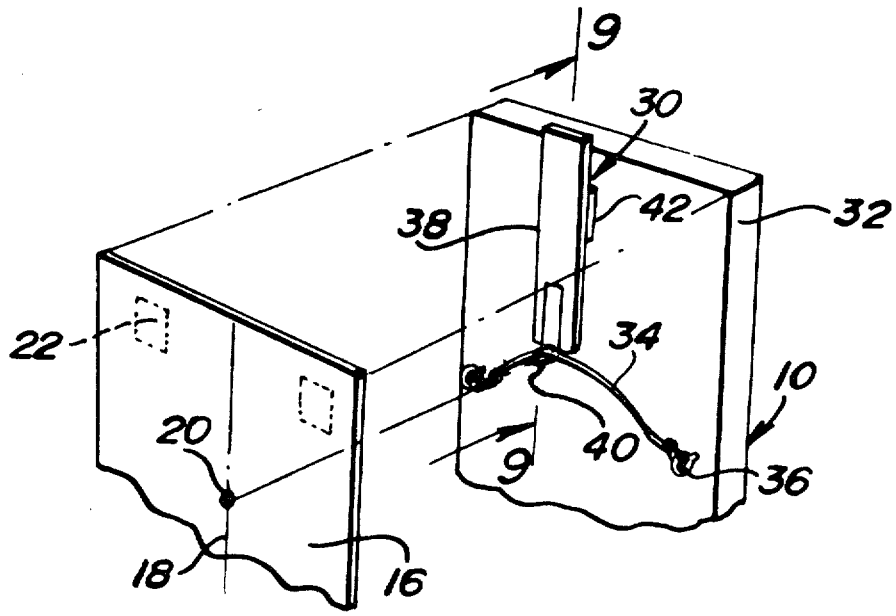

What is claimed is:

1. A method of hanging an article on a supporting surface by means of a hanger engageable with the article at a hanger point thereon, comprising the steps of: tracing an outline of the article on a sheet of material; cutting the sheet of material along said outline to separate a transfer element from the sheet of material; marking a hanger point on the transfer element corresponding to that on the article; positioning the transfer element on the supporting surface at a desired location; securing the hanger to the supporting surface and the positioned transfer element at the hanger point on the transfer element, and removing the transfer element from the supporting surface leaving the hanger secured thereto.

2. The method of claim 1, including the step of: applying adhesive to the transfer element for said holding thereof positioned on the supporting surface.

3. The method of claim 2, wherein the step of marking the hanger point on the transfer element includes: holding a punch tool on the article; and pressing the transfer element onto the article for puncture thereof by the punch tool.

4. The method of claim 3, wherein said article has a flexible suspension element secured thereto on which the hanger point is located when the element is in a load tensioned condition.

5. The method of claim 4, wherein the punch tool is engaged with the suspension element in the load tensioned condition to puncture the transfer element at the hanger point.

6. The method of claim 3, wherein said article has at least two hanger brackets secured thereto at which two hanger points are located.

7. The method of claim 6, wherein the punch tool is engaged with the hanger brackets to puncture the transfer element at the two hanger points.

8. The method of claim 1, wherein said article is a picture frame having a suspension element secured thereto.

9. The method of claim 8, wherein said hanger point is located on the suspension element.

10. The method of claim 9, wherein the step of marking the hanger point on the transfer element includes: exerting a tension applying force to the suspension element at said hanger point for displacement thereof to a hanging condition; placing the transfer element in aligned contact with the picture frame; and puncturing transfer element at the hanger point on the suspension element under tension in the hanging condition.

11. The method of claim 10, wherein said suspension element is a flexible wire.

12. The method of claim 1, wherein said article is a picture frame having a rigid hanger bracket secured thereto on which the contact point is located.

13. For use in hanging an ornamental article on a supporting surface, the article having a hanger device secured thereto, means for locating a hanging point on the supporting surface, including an elongated member having opposite ends, marking means secured to one of said ends for engagement with the hanger device, and removable transfer means responsive to contact with the article for transferring markings made thereon by the marking means to the supporting surface.

14. The combination of claim 13, including adhesive means for holding the elongated member positioned on the article while in engagement with the hanger device.

15. The combination of claim 14 wherein said marking means is a punch element and said removable transfer means is a sheet of flexible paper.

16. The combination of claim 15, wherein said hanger device includes a flexible suspension wire engageable by the marking means.

17. The combination of claim 13, wherein said hanger device is a rigid bracket having a serrated engagement edge engageable by the marking means.

18. The combination of claim 17, wherein said elongated member is a straight-edge ruler having an elongated slot formed therein.

19. The combination of claim 18, wherein said marking means is a punch element and said removable transfer means is a sheet of flexible paper.

* * * * *

UNITED STATES PATENT AND TRADEMARK OFFICE
CERTIFICATE OF CORRECTION

PATENT NO. : 4,457,485

DATED : July 3, 1984

INVENTOR(S) : Madlon C. Landt

It is certified that error appears in the above-identified patent and that said Letters Patent is hereby corrected as shown below:

The title page should be deleted to appear as per attached title page.

Signed and Sealed this

Thirteenth Day of November 1984

[SEAL]

Attest:

GERALD J. MOSSINGHOFF

Attesting Officer

Commissioner of Patents and Trademarks

United States Patent [19]

Landt

[11] Patent Number: 4,457,485
[45] Date of Patent: Jul. 3, 1984

[54] WALL HANGING METHOD AND MEANS
[75] Inventor: Madlon C. Landt, Raleigh, N.C.
[73] Assignee: William E. Lynn, Raleigh, N.C.
[21] Appl. No.: 328,005
[22] Filed: Dec. 7, 1981
[51] Int. Cl.³ .......................................... F16M 13/00
[52] U.S. Cl. ................................. 248/542; 248/544; 33/180 R; 29/407
[58] Field of Search ............. 248/544, 546, 547, 542, 248/467; 33/180 R, 189; 29/407, 526 R

[56] References Cited

U.S. PATENT DOCUMENTS

| | | | |
|---|---|---|---|
| 2,030,135 | 2/1936 | Carpenter | 248/544 |
| 2,775,812 | 1/1957 | Mohr | 248/544 |
| 3,416,765 | 12/1968 | Ebner | 248/467 |
| 3,516,165 | 6/1970 | Pfeffer | 33/189 |
| 3,530,591 | 9/1970 | Moffitt | 248/544 |
| 4,220,309 | 9/1980 | Eisen et al. | 248/544 |
| 4,241,510 | 12/1980 | Radecki | 33/189 |
| 4,372,050 | 2/1983 | Eisenhower | 33/180 R |

Primary Examiner—R. P. Machado
Assistant Examiner—Alvin Chin-Shue
Attorney, Agent, or Firm—Jacob Shuster

[57] ABSTRACT

The outline of a wall hanging object is cut out of a flexible sheet of material to form a transfer blank adapted to be positioned on a wall surface and adhesively held thereon at a desired location. The hanging point on the object is located and transferred to the transfer blank by a marking tool. The hanger device for the object is nailed to the wall surface through the transfer blank at the hanging point marked thereon, after which the transfer blank is removed.

19 Claims, 12 Drawing Figures